United States Patent
Chiu et al.

(10) Patent No.: US 8,582,303 B2
(45) Date of Patent: Nov. 12, 2013

(54) MOUNTING APPARATUS FOR FAN

(75) Inventors: Po-Wen Chiu, New Taipei (TW);
Wen-Hu Lu, Shenzhen (CN);
Zhan-Yang Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 208 days.

(21) Appl. No.: 13/206,708

(22) Filed: Aug. 10, 2011

(65) Prior Publication Data

US 2012/0145877 A1   Jun. 14, 2012

(30) Foreign Application Priority Data

Dec. 10, 2010   (CN) .......................... 2010 1 0582795

(51) Int. Cl.
*H05K 7/16* (2006.01)
(52) U.S. Cl.
USPC ........................ 361/726; 361/725; 248/222.52
(58) Field of Classification Search
USPC .................. 312/223.2, 332.1; 248/27.1, 27.3, 248/222.51, 222.52; 361/725, 726, 727, 361/732, 679.46–679.54, 688–723; 454/184

See application file for complete search history.

(56) References Cited

U.S. PATENT DOCUMENTS

| | | | |
|---|---|---|---|
| 6,231,144 B1 * | 5/2001 | Chen et al. | 312/332.1 |
| 6,407,913 B1 * | 6/2002 | Peachey et al. | 361/679.57 |
| 6,616,106 B1 * | 9/2003 | Dean et al. | 248/27.1 |
| 7,920,384 B2 * | 4/2011 | Westphall et al. | 361/727 |

* cited by examiner

*Primary Examiner* — Alfred J Wujciak
(74) *Attorney, Agent, or Firm* — Altis & Wispro Law Group, Inc.

(57) ABSTRACT

A mounting apparatus for a fan includes a mounting frame adapted to mount the fan, a chassis, a handle, and a positioning assembly. The chassis comprises a side plate. The handle is rotatably attached to the mounting frame and defines a slot. The positioning assembly is mounted to the side plate and comprises a mounting post and two limiting boards. The mounting frame is mounted between the two limiting boards. The mounting post is located between the two limiting boards and engaged in the slot.

20 Claims, 4 Drawing Sheets

MOUNTING APPARATUS FOR FAN

BACKGROUND

1. Technical Field

The present disclosure relates to mounting apparatuses for fans, and particularly to a mounting apparatus for fans used in a server.

2. Description of Related Art

One or more fans are used for cooling in a computer or a server. Usually, the fans are secured to a mounting frame, and the mounting frame is secured to a chassis of the computer or the server with screws, which is laborious and time consuming. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
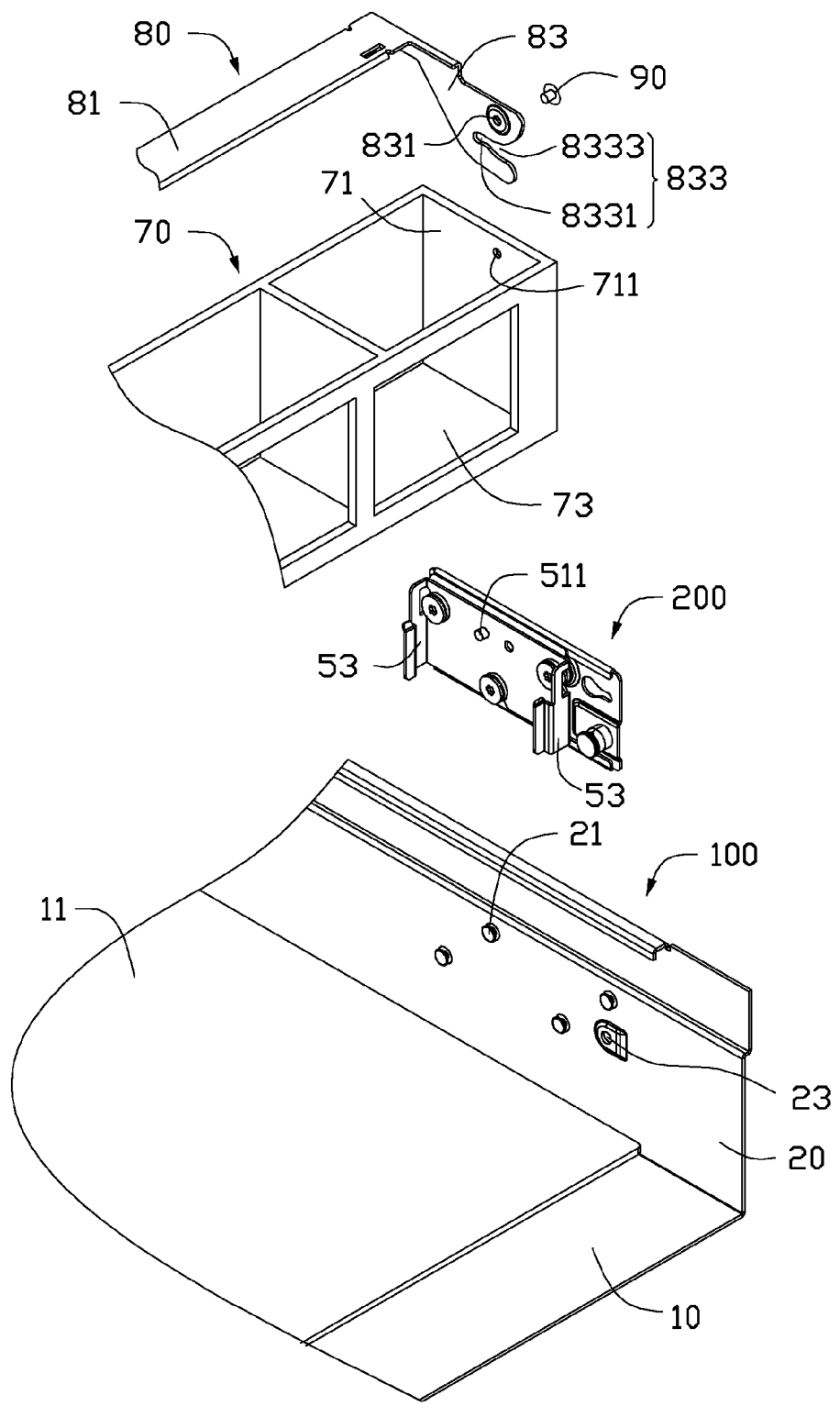
FIG. 1 is an exploded, isometric view of one embodiment of a mounting apparatus.

Referring to FIG. 1, a fan mounting apparatus includes a chassis 100, two positioning assemblies 200 (only one positioning assembly 200 is shown in FIGS. 1-4), a mounting frame 70, and a handle 80.

The mounting frame 70 includes a bottom wall 73 and two opposite sidewalls 71. The two sidewalls 71 are substantially perpendicular to the bottom wall 73. Each sidewall 71 defines a first linking hole 711. A plurality of receiving spaces can be defined among the two sidewalls 71 and the bottom wall 73 separated by partitions (not labeled).

The chassis 100 includes a bottom plate 10 and two opposite side plates 20. The bottom plate is substantially perpendicular to the two side plates 20. A circuit board 11 is secured to the bottom plate 10. Each side plate 20 defines a receiving hole 23. A plurality of positioning posts 21 is located on each side plate 20. In one embodiment, the cross-section of the positioning post 21 is round.

Figure 2:
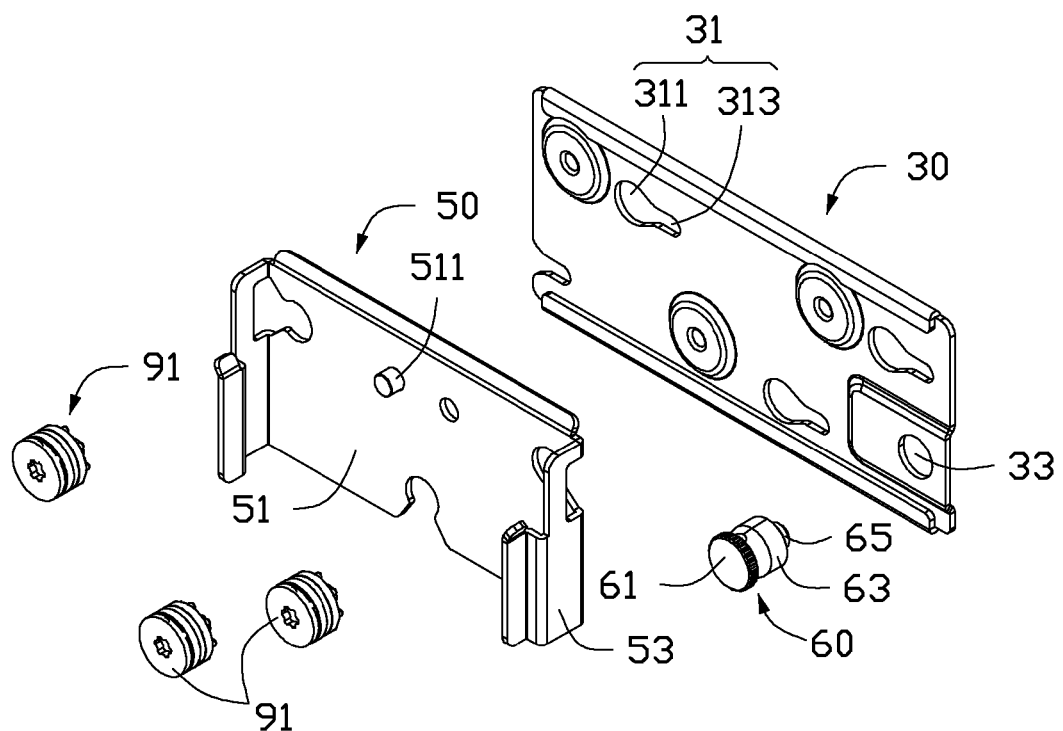
FIG. 2 is an exploded, isometric view of a positioning assembly of the mounting apparatus of FIG. 1.

Referring to FIG. 2, the positioning assembly 200 includes a first positioning member 30, a second positioning member 50, and an operating member 60. The first positioning member 30 defines a limiting hole 33 and a plurality of locking holes 31 corresponding to the positioning posts 21. Each locking hole 31 includes an inserting portion 311 and a locking portion 313. The positioning post 21 is engaged in the locking portion 313 through the inserting portion 311. The second positioning member 50 is mounted to the first positioning member 30 with a plurality of second locking members 91, such as screws. The second positioning member 50 includes a positioning board 51 and two limiting boards 53. The two limiting boards 53 extend from two opposite edges of the positioning board 51. A mounting post 511 extends from the positioning board 51. In one embodiment, a cross-section of the mounting post 511 is round. The operating member 60 is secured to the first positioning member 30 and includes an operating portion 61, a mounting portion 63, and a limiting portion 65. The operating portion 61 is connected to the mounting portion 63 by a spring (not shown). The limiting portion 65 is mounted to the operating portion 61 and is inserted in and through the mounting portion 63. The mounting portion 63 is mounted to the first positioning member 30. The limiting portion 65 is inserted out through the limiting hole 33. The limiting portion 65 is capable of moving along a first direction towards the operating portion 61 by pulling the operating portion 61 to move away from the mounting portion 63. The limiting portion 65 is slid along a second direction opposite to the first direction with the elastically deformed spring.

Referring to FIG. 1, the handle 80 includes an operating rod 81 and two rotating boards 83 extending from the two opposite sides of the operating rod 81. The operating rod 81 is substantially perpendicular to the rotating boards 83. Each rotating board 83 defines a second linking hole 831 and a slot 833. The slot 833 includes a guiding portion 8333 and a positioning portion 8331 connected to the guiding portion 8333. The width of the guiding portion 8333 is larger than that of the positioning portion 8331, and larger than the diameter of the mounting post 511. The width of the positioning portion 8331 is substantially equal to the diameter of the mounting post 511. A first locking member 90, such as a screw, is inserted into the second linking hole 831 and the first linking hole 711, to pivotally mount the handle 80 to the mounting frame 70. The handle 80 is rotatable around the first locking member 90.

Figure 3:
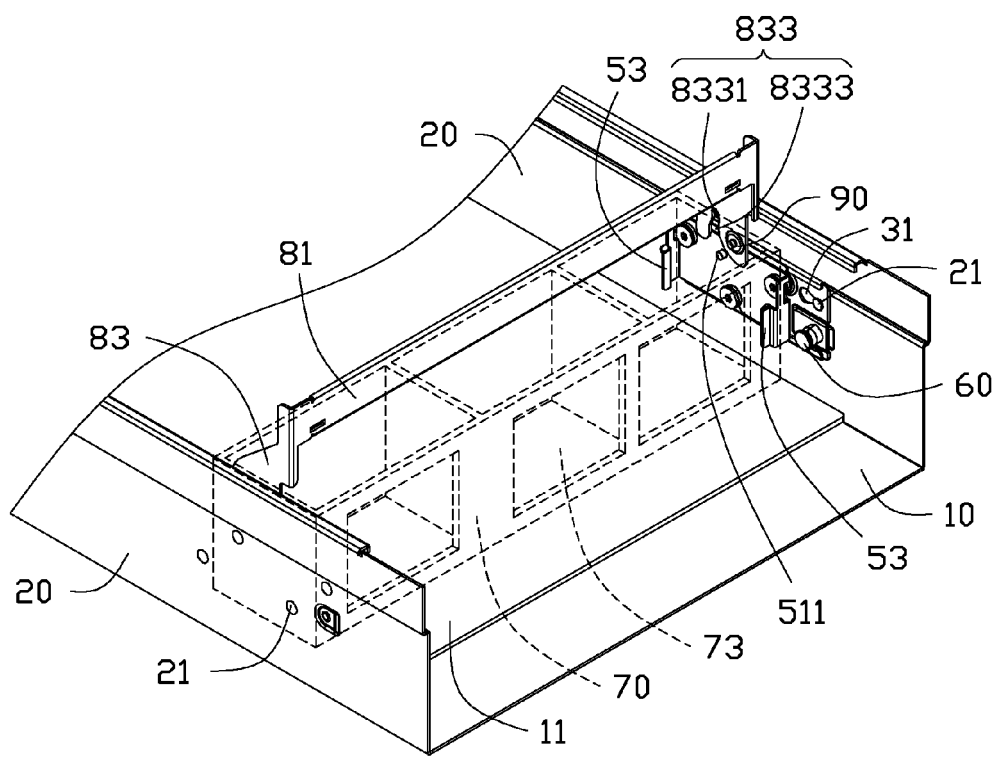
FIG. 3 is an isometric view of the assembled mounting apparatus of FIG. 1.
Figure 4:
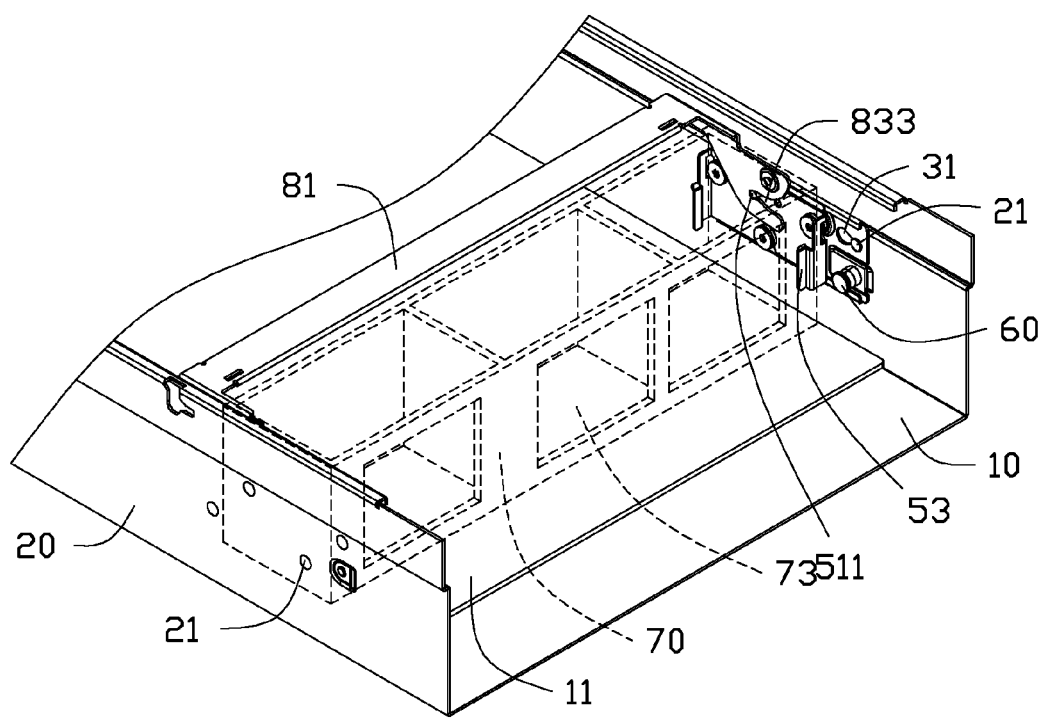
FIG. 4 is similar to FIG. 3, but viewed from another aspect.

Referring to FIGS. 3 and 4, in assembly, the positioning assembly 200 is moved towards the side plate 20 until the inserting portion 311 is aligned with the positioning post 21. The operating portion 61 is pulled to elastically deform the spring, the limiting portion 65 is slid along the first direction, and the positioning post 21 is inserted into the inserting portion 311. The limiting portion 65 abuts the side plate 20 and is adjacent to the receiving hole 23. The positioning assembly 200 is moved along a direction substantially parallel to the side plate 20. The positioning post 21 is then engaged in the locking portion 313 of the locking hole 31. In this position, the limiting portion 65 is aligned with the receiving hole 23, and the spring elastically responds to drive the limiting portion 65 to slide along the second direction into the receiving hole 23. The positioning assembly 200 is secured to the side plate 20.

The handle 80 is rotated around the first locking member 90 until the operating rod 81 is substantially perpendicular to the bottom wall 73. The mounting frame 70 is carried and is positioned between the two side plates 20, and the sidewall 71 is located between the two limiting boards 53. The mounting frame 70 is slid downward along the two limiting boards 53, until an edge of the guiding portion 8333 of the slot 833 abuts the mounting post 511. The operating rod 81 is pulled to drive the handle 80 to rotate around the first locking member 90, and the mounting post 511 is slid into the positioning portion 8331 from the guiding portion 8333. Until the operating rod 81 is substantially parallel to the bottom wall 73, the mounting post 511 is engaged in the positioning portion 8331. Thus, the mounting frame 70 is mounted to the chassis 100.

In disassembly, the handle 80 is rotated, the mounting post 511 is disengaged from the positioning portion 8331 and slid into the guiding portion 8333. Until the operating rod 81 is substantially perpendicular to the bottom wall 73, the edge of the guiding portion 8333 abuts the mounting post 511. The mounting frame 70 is carried upward along the two limiting boards 53, and then the mounting frame 70 can be removed from the chassis 100.

The operating portion 61 is pulled along the direction far away from the first positioning member 30, the limiting portion 65 is elastically deformed and disengages from the receiving hole 23. At the same time, the positioning assembly 200 is moved along the direction substantially parallel to the side plate 20, and the positioning post 21 disengages from the locking portion 313 and slides into the inserting portion 311. The positioning assembly 200 moves along the direction away from the side plate 20, and the positioning assembly 200 is then removed. The limiting portion 65 responds elastically. In this position, the positioning assembly 200 cannot block the circuit board 11.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and the arrangement of parts within the principles of the disclosure, to the full extent indicated by the broad general meaning of the terms in which the appended claims are expressed.

What is claimed is:

1. A mounting apparatus for a fan, the mounting apparatus comprising:
   a mounting frame adapted to mount the fan;
   a chassis comprising two side plates and a positioning post located in the side plate;
   a handle rotatably attached to the mounting frame and defining a slot; and
   a positioning assembly mounted to one of the side plates and comprising a mounting post and two limiting boards;
   wherein the mounting frame is mounted between the two limiting boards, and the mounting post is located between the two limiting boards and engaged in the slot; the positioning assembly defines a locking hole, and the positioning post is engaged in the locking hole.

2. The mounting apparatus of claim 1, wherein the locking hole comprises an inserting portion and a locking portion communicating with the inserting portion, and the positioning post is engaged in the locking portion through the inserting portion.

3. The mounting apparatus of claim 1, wherein the positioning assembly comprises a first positioning member and a second positioning member connected to the first positioning member, the locking hole is defined in the first positioning member, and the mounting post and the two limiting boards are located in the second positioning member.

4. The mounting apparatus of claim 3, wherein the positioning assembly further comprises an operating member located in the first positioning member and adapted to prevent the positioning assembly from moving.

5. The mounting apparatus of claim 4, wherein the operating member comprises an operating portion, a mounting portion secured to the first positioning member, and a limiting portion secured to the operating portion and extending out of the first positioning member.

6. The mounting apparatus of claim 5, wherein the side plate defines a receiving hole receiving the limiting portion, and the limiting portion is disengaged from the receiving hole when the operating portion is pulled.

7. The mounting apparatus of claim 1, wherein the handle comprises an operating rod and a rotating board connected to the operating rod, the rotating board being substantially perpendicular to the operating rod.

8. The mounting apparatus of claim 7, wherein the slot is defined in the rotating board and comprises a guiding portion and a positioning portion communicating with the guiding portion, and the mounting post is engaged in the positioning portion.

9. The mounting apparatus of claim 8, wherein the width of the guiding portion is larger than that of the positioning portion.

10. The mounting apparatus of claim 8, wherein a cross-section of the mounting post is round, and the width of the positioning portion is substantially equal to the diameter of the mounting post.

11. A mounting apparatus for a fan, the mounting apparatus comprising:
    a mounting frame adapted to mount the fan;
    a chassis comprising two side plates receiving the mounting frame therebetween;
    a handle rotatably attached to the mounting frame and defining a slot; and
    a positioning assembly mounted to one of the two side plates and comprising a mounting post and two limiting boards;
    wherein the mounting frame is mounted between the two limiting boards, the slot comprises a guiding portion and a positioning portion; the handle is rotatable between a first position wherein the positioning portion is engaged with the mounting post, and a second position wherein the positioning portion is disengaged from the mounting post and an edge of the guiding portion abuts the mounting post.

12. The mounting apparatus of claim 11, wherein the handle comprise an operating rod and a rotating board connected to the operating rod, the rotating board is substantially perpendicular to the operating rod, and the slot is defined in the rotating board.

13. The mounting apparatus of claim 11, wherein the positioning portion is communicating with the guiding portion, and the width of the guiding portion is larger than that of the positioning portion.

14. The mounting apparatus of claim 11, wherein a cross-section of the mounting post is round, and the width of the positioning portion is substantially equal to the diameter of the mounting post.

15. The mounting apparatus of claim 11, wherein the chassis further comprises a positioning post located in the one of the two side plates, the positioning assembly defines a locking hole, and the positioning post is engaged in the locking hole.

16. The mounting apparatus of claim 15, wherein the locking hole comprises an inserting portion and a locking portion communicating with the inserting portion, and the positioning post is engaged in the locking portion through the inserting portion.

17. The mounting apparatus of claim 15, wherein the positioning assembly comprises a first positioning member and a second positioning member connected to the first positioning member, the locking hole is defined in the first positioning member, and the mounting post and the two limiting boards are located in the second positioning member.

18. The mounting apparatus of claim 17, wherein the positioning assembly further comprises an operating member preventing the positioning assembly from moving; the operating member is located in the first positioning member and comprises an operating portion, a mounting portion secured to the first positioning member, and a limiting portion secured to the operating portion and extending out of the first positioning member.

19. The mounting apparatus of claim 18, wherein the one of the two side plates defines a receiving hole receiving the limiting portion, and the limiting portion is disengaged from the receiving hole when the operating portion is pulled.

20. A mounting apparatus for a fan, the mounting apparatus comprising:
- a mounting frame adapted to mount the fan;
- a chassis comprising two side plates and a positioning post located in one of the side plates;
- a handle rotatably attached to the mounting frame and defining a slot; and
- a positioning assembly mounted to the side plate and comprising a mounting post and two limiting boards;
- wherein the mounting frame is mounted between the two limiting boards, the slot comprises a guiding portion and a positioning portion; the handle is rotatable between a first position wherein the positioning portion is engaged with the mounting post, and a second position wherein the positioning portion is disengaged from the mounting post and an edge of the guiding portion abuts the mounting post; the positioning assembly defines a locking hole, and the positioning post is engaged in the locking hole.

* * * * *